United States Patent [19]

Mendy et al.

[11] 4,302,477

[45] Nov. 24, 1981

[54] FOOD OR DIETETIC SUBSTANCES HAVING AN ALVEOLAR STRUCTURE AND PROCESS OF PREPARING SAME

[75] Inventors: Francois Mendy, Boulogne; Sylvain Blain, Corbeil Essonnes; Roland Domer, Paris, all of France

[73] Assignee: Roussel Uclaf, Paris, France

[21] Appl. No.: 210,228

[22] Filed: Nov. 25, 1980

Related U.S. Application Data

[63] Continuation of Ser. No. 42,110, May 24, 1979, abandoned, which is a continuation of Ser. No. 788,445, Apr. 18, 1977, abandoned.

[30] Foreign Application Priority Data

Apr. 20, 1976 [FR] France .............................. 76 11565

[51] Int. Cl.$^3$ ............................................ A21D 13/06
[52] U.S. Cl. ................................... 426/250; 426/559; 426/656; 426/657; 426/445; 426/516
[58] Field of Search ................. 426/62, 104, 656, 657, 426/456, 516, 800, 804, 559, 250, 445

[56] References Cited

U.S. PATENT DOCUMENTS

| | | | |
|---|---|---|---|
| 3,442,658 | 5/1969 | Okumura | 426/62 X |
| 3,446,623 | 5/1969 | Gray et al. | 426/550 X |
| 3,814,819 | 6/1974 | Morgan | 426/656 |
| 3,851,081 | 11/1974 | Epstein | 426/559 |
| 3,911,142 | 10/1975 | Huelskamp et al. | 426/559 |
| 3,930,055 | 12/1975 | Engelman et al. | 426/657 X |
| 3,978,236 | 8/1976 | Sair et al. | 426/580 X |

FOREIGN PATENT DOCUMENTS 987174 3/1965 United Kingdom .

*Primary Examiner*—Robert A. Yoncoskie
*Attorney, Agent, or Firm*—Bacon & Thomas

[57] ABSTRACT

The present invention has as an object new food or dietetic substances high in protein and having an alveolar structure as well as a process for the preparation of this new food substance.

11 Claims, No Drawings

FOOD OR DIETETIC SUBSTANCES HAVING AN ALVEOLAR STRUCTURE AND PROCESS OF PREPARING SAME

This is a continuation of application Ser. No. 42,110, filed May 24, 1979 now abandoned which is a continuation of Ser. No. 788,445, filed Apr. 18, 1977, now abandoned.

The present invention has as an object new food or dietetic substances having an alveolar structure as well as a process for the preparation of this new food substance.

Numerous pathological situations, such as therapeutic cures of obesity, certain states of Plethora, paradiabetes, diabetes, the treatment of severe atherosclerosis, the treatment of certain infectious conditions, inflammation or trauma accompanying severe anoxemia, or during convalescence from serious surgical operations, either by themselves, or because of therapeutic measures which they require, cause a consumption of endogenous protein in a patient which results in a loss of proteinaceous substance.

For adolescents and adults this loss of protein carries the risk of being final thereby leaving the organism at the end of the illness, in an inferior or weakened condition compared to its condition prior to the pathological experience.

From a metabolic viewpoint, the treatment of this condition requires a supply of protein. It might be necessary that glucides, lipids and/or mineral elements are excluded from this protein supply.

From a metabolic viewpoint, it is advantageous if the protein supply as much as possible is provided orally, leaving the parenteral route for the most serious cases.

From a psychological as well as a metabolic viewpoint, it is very desirable for the protein supply, free of glucides, and/or lipids and/or mineral elements or including these components in only small amounts, that is, in an amount which is always less than 10%; to have a form having an appearance similar to food which is usually consumed. In other words, in a palatable form.

So far as applicants are aware, there does not exist in nature or among the conventional foods, a product containing at least 60% protein (on a dry weight basis) and having the appearance of food, especially a bakery product such as bread or a biscuit. Until the present, such a product having acceptable organoleptic properties even appeared to be inconceivable.

Applicants have thus discovered a new food substance which supplies the organism with the needed protein in a food form which is agreeable to the consumer, and which notably may be consumed in the form of a fine bread or biscuit.

Thus, applicants have found a way to prepare a food or dietetic substance having an alveolar structure using mixtures of proteins originating from animals or vegetables, a portion of which is albumins, which are mixed in certain proportions and conditions.

The present invention also has as an object a food or dietetic substance having an alveolar structure characterized in that it contains at least 60% animal or vegetable protein of which at least 16% is albumin, and more particularly from 16 to 40%.

The term food or dietetic substance having an alveolar structure, includes a substance having the structure of bakery products, pastry or biscuits such as particularly breads, rolls, rusk, cracker, longuets, or toast.

The proteins of animal or vegetable origin other than the albumin, may be proteins isolated from milk, proteins isolated from the blood of certain animals, such as cattle; fish protein; also proteins isolated from certain vegetables such as soya.

The albumins used in the invention may be ovalbumin, lactalbumin, or albumins which are isolated from the blood of certain animals such as cattle or albumins isolated from certain vegetables such as leguminous plants.

Stating that the food or dietetic substance includes at least 60% animal or vegetable protein of which at least 16% are albumins, is to say that the food or dietetic substance includes at least 50% animal or vegetable protein other than albumins and at least 10% albumins in weight proportion to the aforesaid substance.

Among the food or dietetic substances of the invention defined herein, it is preferred that the animal or vegetable proteins, other than the albumin consists of alkaline, alkaline-earth, or ammonium caseinates or mixtures thereof.

Among the latter one notes most particularly, those characterized in that they are the caseinates of sodium, potassium, calcium, ammonia, or mixtures thereof. The most preferred of these is sodium caseinate.

The present invention is also directed to a food or dietetic substance as earlier described characterized in that the albumin is ovalbumin or lactalbumins.

The dietetic or food substance of this invention preferably contains at least 60% caseinate and at least 20% albumin.

The dietetic or food substance of the present invention may also contain starch. The starch in the substance may come from various starches and/or cereal meals, or from tubercules, particularly such as starches and meals of wheat, of rye, barley, rice, maize, potatoes or manioc.

When the dietetic or food substance contains starch, the proportion of starch present is about 5% and practically always less than 10%.

The food or dietetic substance of the invention may also contain yeasts. The yeasts may be provided in a living or dead form and may be constituted notably by baking yeast, milk yeast, or divers torulae.

When the dietetic or food substance of the invention contain yeast, the proportion of which may be present is of the order of 5% and almost always less than 10%.

The food or dietetic substance of the invention may also contain various conventional ingredients to add aroma or give a particular color or flavor to the products.

The food or dietetic substances of the present invention preferably contain an amount of water which is less than 15%. This amount of water is preferably less than 10%. However, the substance of the invention should contain at least about 3% water.

The present invention has also as an object the process of preparation of the afore-described food or dietetic substance which is characterized in that one malaxes, kneads, with water a mixture of the various ingredients to obtain a paste which is subsequently subjected at a temperature of at least ambient but less than the temperature at which the proteins coagulate, to a physical compressive force and then to press the product into the desired physical form and bake the latter so as to obtain a dietetic or food substance having an alveolar structure.

According to an embodiment of this invention, the process described above is characterized as follows:
(a) The kneading of the mixture of the ingredients with water is preferably carried out with at least 20 parts of water to 100 parts of the mixture,
(b) the temperature is between ambient and a temperature below the temperature at which the proteins coagulate, preferably between 30° C. and 65° C.,
(c) the physical compressive treatment consists of an extrusion of the paste,
(d) the cooking is rapid and is effected in two successive phases.

The kneading with water of the mixture of several ingredients, the heating and the extrusion of the paste according to the invention, may be performed in the same apparatus, such as a cooking-extruder. Such a cooking-extruder may be, for example, the cooking-extruder manufactured by the Societe Creusot-Loire, Type B.C. 45-two-screw. The latter apparatus includes a volumetric feed by an Archimedes screw, a heating and cooling system, and interchangeable modular members forming together two screws and permitting successively the transportation and the beginning of compression, a kneading, and a final compression of the ingredients or of the resulting paste. The extrusion screws are enclosed in a sleeve.

The apparatus which is used can, for example, include seven interchangeable modular members of variable lengths, each means having a variable pitch. The final compression is effected by means of the last modular members and in a conical compression chamber.

The die which is situated at the end of the apparatus may enable the direct production of the paste in the desired physical form. Thus, for example, when one desires to prepare longuets, one can advantageously utilize a cylindrical die or one in the form of a comma.

It is evident that the preparation of the paste may be achieved in any apparatus equivalent to that described.

Baking is advantageously performed in two successive phases. In the course of the first heating phase, the paste is subjected to a temperature above 250° C. and, preferably in the neighborhood of 300° C. for 7 to 10 minutes. During the course of the second step, the paste is subjected to a temperature of less than 200° C. and preferably in the neighborhood of 160° C. for 4 to 10 minutes.

The cooking is advantageously performed continuously in a cooking tunnel.

The following nonlimiting working examples are now provided:

EXAMPLE 1

A type B.C. 45-two screw cooking-extruder manufactured by Creusot-Loire was used. This cooker-extruder comprises a volumetric feed by an Archimede screw, a cooling system, an induction heater, and interchangeable modular elements together forming two coacting screws which permits the successive transportation, start of compression, kneading and final compression of the resultant paste.

In the central part of the apparatus, there is a heating and cooling system which permits adjustment of the temperature of the paste. At the end of the apparatus, the paste passes through two orifices, the area of the extrusion orifices is 0.40 cm$^2$.

First, 2,925 grams of sodium caseinate, 1,206 grams of powdered egg whites and 369 grams of cornstarch are mixed until a homogeneous mixture results. The resulting mixture was introduced into the cooker-extruder and the rate of flow was regulated to furnish 200 g/minute of the mixture (caseinate-egg whites-starch). Water is simultaneously added at the rate of 100 cm$^3$/minute and the heating system for the paste of the cooker-extruder is adjusted to 45° C.

After extrusion, a homogeneous paste is obtained which is cut and which is distributed in the boudoir type moulds recovered with lids.

They are heated in an oven for 9 minutes at 300° C., then at 150° C. for 9 minutes. After baking, the longuets obtained are in the form of a crisp product, very alveolar and colored.

EXAMPLE 2

2,124 grams of ammonium caseinate and 876 grams of powdered egg whites are mixed until homogeneous.

The thus obtained mixture is introduced in a cooker-extruder manufactured by Creusot-Loire, type B.C. 45-two screw. The flow rate was regulated to furnish 200 grams/minute of the mixture (ammonium caseinate and powdered egg whites). Water is simultaneously added at the rate of 100 cm$^3$/minute and the heating system for heating the paste of the cooker-extruder is adjusted to 40° C.

After extrusion, a homogeneous paste is obtained which is distributed in the boudoir moulds. These are placed in an oven at 310° C. for 8½ minutes, after baking longuets are obtained which are strongly colored and weigh on the average 3.1 grams (from a paste weight of the longuet of 4.5 grams).

EXAMPLE 3

2,600 grams of sodium caseinate are mixed with 1,000 grams of powdered egg whites and 360 grams of crushed powdered rusk to form a homogeneous mixture.

The thus obtained mixture is introduced in a Creusot-Loire type B.C. two-screw cooker-extruder. The rate of flow of the apparatus was regulated to furnish 220 grams/minute of the mixture which comprises sodium caseinate, e.g., powdered egg whites and crushed powdered rusk. Water is simultaneously added at the rate of 110 cm$^3$/minute and the heating system of the cooker-extruder for heating the paste is adjusted to 50° C.

After extrusion, a homogeneous paste is obtained which is distributed in the boudoir type moulds.

They are heated in an oven for 7 minutes at 310° C. and for 4 minutes at 160° C., after baking longuets are obtained which weigh on the average 3.15 grams (from a paste weight of the longuet of 4.5 grams).

EXAMPLE 4

1,300 grams of sodium caseinate, 536 grams of powdered egg whites and 164 grams of granular dried active yeast are mixed until a homogeneous mixture results.

The resulting mixture was introduced into a Creusot-Loire type B.C. 45-two screw cooker-extruder. The rate of flow of the apparatus was regulated to furnish 200 grams/minute of the mixture consisting of the sodium caseinate, powdered egg whites and the granular dried active yeast. Water is simultaneously added at a rate of 100 cm$^3$/minute and the heating system for heating the paste of the cooker-extruder is adjusted to 47° C.

After extrusion, a homogeneous paste is obtained which is distributed in the boudoir-type moulds.

They are heated in an oven for 8 minutes at 310° C., after baking longuets are obtained which weigh on the average 3.3 grams (from a paste weight of the longuet of 4.7 grams).

EXAMPLE 5

2,275 grams of sodium caseinate are mixed with 938 grams of powdered egg whites and 287 grams of dried active powdered yeast until a homogeneous mixture results.

The resulting homogeneous mixture is introduced into a Creusot-Loire type B.C. 45-two screw cooker-extruder. The rate of flow of the apparatus was regulated to furnish 200 grams/minute of the mixture comprising the powders; water was simultaneously added at a rate of 100 cm$^3$/minute and the heating system for the paste of the cooker-extruder is adjusted to 35° C. (temperature of the paste 60° C.).

After extrusion, a homogeneous paste is obtained which is distributed in the boudoir moulds. They are heated in an oven for 9 minutes at 310° C., then for 4 minutes at 160° C. and after baking longuets are obtained having a meaty taste and weighing on the average 3.0 grams (from an in initial paste weight of the longuets of 4.4 grams).

EXAMPLE 6

2,730 grams of sodium caseinate is mixed with 1,125 grams of powdered egg whites and 345 grams of active yeast until a homogeneous mixture is obtained.

The resulting mixture is introduced into a Creusot-Loire type B.C. 45-two screw cooker-extruder. The rate of flow of the apparatus is regulated to furnish 200 grams/minute of the mixture comprising the sodium caseinate, egg whites and active yeast. Water is simultaneously added at the rate of 75 cm$^3$/minute and the system for heating the paste of the cooker-extruder is adjusted to 45° C. (temperature of the paste is 61° C.).

After extrusion, a homogeneous paste is obtained which is distributed in the boudoir type moulds.

They are heated in an oven for 9 minutes at 310° C., then at 160° C. for 4 minutes. After baking, longuets are obtained having an average weight of 3.1 grams (from a paste weight of the longuet of 4.5 grams).

EXAMPLE 7

2,025 grams of sodium caseinate is mixed with 834 grams of powdered egg whites and 141 grams of granular active yeast to obtain a homogeneous mixture.

The obtained mixture is introduced into a Creusot-Loire type B.C. 45-two-screw cooker-extruder. The rate of flow of the apparatus is regulated to furnish 200 grams/minute of the mixture comprising the powders; water was simultaneously added at a rate of 100 cm$^3$/minute and the system for heating the paste of the cooker-extruder is adjusted to 47° C. (temperature of the paste 53° C.).

After extrusion, a homogeneous paste is obtained which is distributed in the boudoir type moulds.

They are heated in an oven for 10 minutes at 310° C., then at 160° C. for 4 minutes, after baking, longuets are obtained having an average weight of 3.2 grams (from an initial paste weight of the longuet of 5 grams).

EXAMPLE 8

One mixes to a homogeneous mass 6390 g of sodium caseinate with 2610 g of powdered egg white.

In addition one mixes with a whip 113 g of fresh bakers' yeast, 1130 g of wheat flour and 1130 g of water at 30° C., then adds 78 g of sugar. One allows to stand for 2 hours at 30° C. One obtains a leaven to which one adds 2600 g of water at 10° C. and one then mixes to a homogeneous mass.

One introduces the mixture of sodium caseinate and powdered egg white into the cooker-extruder and regulates the output from the apparatus so that it provides 200 g/minute of the mixture (caseinate-egg white). At the same time one adds the solution of the leaven to which has been added water prepared previously, at the rate of 100 cm$^3$/minute and sets the cooker-extruder system for heating the dough at 45° C.

After extrusion one obtains a homogeneous dough which one cuts up and distributes in "boudoir" type moulds covered with lids. One takes to 300° C. for 9 minutes in an oven, then to 150° C. for 9 minutes. After cooking one thus obtains bread sticks which are in the form of a well alveolated crisp product.

EXAMPLE 9

One mixes to an homogeneous mass 7100 g sodium caseinate with 2900 g of powdered egg white.

In addition one mixes with a whip 200 g of fresh bakers' yeast, 600 g of wheat flour and 600 g of water at 30° C. One allows to stand for 4 hours at 30° C. One obtains a leaven to which one adds 4300 g of water at 10° C. and then one mixes to a homogeneous mass.

One introduces the mixture of the sodium caseinate and the powdered egg white into the cooker-extruder. One controls the output from the apparatus so that it provides 200 g/minute of the mixture (caseinate - egg white) and at the same time one adds the solution of the leaven to which has been added water prepared previously, at the rate of 100 cm$^3$/minute. One sets the cooker-extruder system for heating the dough at 45° C.

After extrusion one obtains a homogeneous dough which one cuts up and distributes in "boudoir" type moulds. One takes to 310° C. for 8 minutes in an oven. After cooking one thus obtains bread sticks which are in the form of a well alveolated and highly coloured crisp product.

EXAMPLE 10

Operating as indicated in Example 3 but starting with 1580 g of sodium caseinate, 340 g of powdered egg white and 80 g of hydrolysed casein, one obtains, after cooking at 310° C. for 8 minutes, bread sticks which are in the form of a well alveolated product.

EXAMPLE 11

Operating as indicated in Example 3 but starting with 720 g of potassium caseinate, 200 g of a concentrate of lacto-serum containing 80% of protein, 80 g of sugar and 400 g of water containing vanilla extract, one obtains after cooking at 300° C. for 9 minutes, then 9 minutes at 150° C., bread sticks which are in the form of a well alveolated and highly coloured product.

What is claimed is:

1. A process for preparing a dietetic bakery product having an aveolar structure which consists essentially of the steps of
   (a) kneading a mixture consisting essentially of at least 60% of animal or vegetable proteins of which a portion of 16–40% is albumin and the remaining portion is an animal or vegetable protein originated from a proteinaceous material selected from the group consisting of milk, cattle blood, fish, soya or mixtures thereof with the remainder being selected from the group consisting of starches, cereal meals, flavoring agents, coloring agents, and mixtures thereof with a sufficient amount of water to obtain an extrudable paste; subsequently (b) extruding the extrudable paste at a temperature which is at least ambient but less than the temperature at which the proteins in the paste coagulate to obtain a formable paste product; subsequently (c) forming the paste product into a desired shape; and subsequently (d) baking the formed paste product at a baking temperature and for a period of time sufficient to obtain the bakery product.

2. The process as defined in claim 1, wherein the animal or vegetable protein other than albumin is an alkali-, alkaline-earth- or ammonium caseinate or mixtures thereof.

3. The process as defined in claim 2, wherein the caseinate is sodium, potassium, calcium or ammonium caseinate or mixtures thereof.

4. The process as defined in claim 3, wherein the caseinate is sodium caseinate.

5. The process as defined in claim 1, wherein the albumin is ovalbumin or lactalbumins.

6. The process as defined in claim 2, wherein the proteins contain at least 60% caseinate and at least 20% albumin.

7. The process as defined in claim 1, wherein said mixture contains starch in an amount not exceeding 10%.

8. The process as defined in claim 21, wherein the starch is in the form of a meal prepared from or a starch isolated from a starch-containing material selected from the group consisting of cereals, tubercules and mixtures thereof.

9. The process as defined in claim 1, wherein in step (a) the kneading of the mixture of the ingredients with water is carried out with an amount of at least 20 parts of water to 100 parts of the mixture;

in step (b) the temperature of extruding is between about 30° and about 65° C.; and in step (c) the baking is effected in two successive phases.

10. The process as defined in claim 9, wherein the baking step (c) comprises two successive heating phases including a first heating phase wherein the formed paste product is subjected to a temperature of from above 250° to about 300° C. and a subsequent heating phase wherein the product is subjected to a temperature between about 160° and less than 200° C.

11. A dietetic bakery product having an aveolar structure obtained by the process as defined in claim 1 which consists essentially of at least 60% of animal or vegetable proteins of which a portion of 16–40% is albumin and the remaining portion is an animal or vegetable protein originated from a proteinaceous material selected from the group consisting of milk, cattle blood, fish, soya or mixtures thereof with the remainder being selected from the group consisting of starches, cereal meals, flavoring agents, coloring agents, and mixtures thereof, and an amount of water not exceeding 15%.

* * * * *